(12) United States Patent
Okazaki (10) Patent No.: US 8,740,282 B2
(45) Date of Patent: Jun. 3, 2014

(54) VEHICULAR SUN VISOR

(75) Inventor: Yutaka Okazaki, Chigasaki (JP)

(73) Assignee: Kasai Kogyo Co., Ltd., Koza-gun (JP)

( * ) Notice: Subject to any disclaimer, the term of this patent is extended or adjusted under 35 U.S.C. 154(b) by 0 days.

(21) Appl. No.: 12/216,283

(22) Filed: Jul. 2, 2008

(65) Prior Publication Data

US 2010/0001548 A1 Jan. 7, 2010

(51) Int. Cl.
*B60J 3/02* (2006.01)

(52) U.S. Cl.
USPC ........................................................ 296/97.11

(58) Field of Classification Search
USPC ............... 296/97.1, 97.11, 97.9, 97.12, 97.13
See application file for complete search history.

(56) References Cited

U.S. PATENT DOCUMENTS

| | | | | |
|---|---|---|---|---|
| 6,698,814 B1 * | 3/2004 | Mills et al. | ................ | 296/97.11 |
| 6,962,385 B2 * | 11/2005 | Wieczorek et al. | ........ | 296/97.11 |
| 7,090,281 B2 * | 8/2006 | Davey et al. | ................ | 296/97.11 |
| 2005/0200155 A1 | 9/2005 | Asai | | |
| 2006/0163901 A1 | 7/2006 | Hiraga | | |

FOREIGN PATENT DOCUMENTS

| | | |
|---|---|---|
| GB | 1-567-710 A | 5/1980 |
| JP | 09-254649 | 9/1997 |
| JP | 2003-312258 | 11/2003 |
| JP | 2004-009883 | 1/2004 |

OTHER PUBLICATIONS

European Search Report, Jul. 30, 2008.
Office Action for Chinese Patent Application 200810146307.7, Chinese Patent Office, Feb. 12, 2011.

* cited by examiner

*Primary Examiner* — Glenn Dayoan
*Assistant Examiner* — Melissa A Black
(74) *Attorney, Agent, or Firm* — Kubotera & Associates, LLC (57) ABSTRACT

A coming-off preventing contacting piece 6 that extendingly projects in the radial direction of a shaft 3 throughout the entire periphery is formed in an insertion-side part 3*a* of the shaft 3 that turnably supports a sun visor body 1, and a contacted piece 7 with which the coming-off preventing contacting piece 6 contactingly engages is formed on the sun visor body 1 side to prevent the sun visor body 1 from coming off the shaft 3. Thereby, even if the sun visor body 1 receives a high expandingly deploying force of a curtain airbag, the concentrated load per unit area applied to the coming-off preventing contacting piece 6 is kept low, and therefore the coming-off preventing contacting piece 6 is restrained from being broken.

3 Claims, 9 Drawing Sheets

VEHICULAR SUN VISOR

BACKGROUND OF THE INVENTION

1. Field of the Invention

The present invention relates to a vehicular sun visor for shading the radiated light such as sunlight and headlamp light of cars in opposite lanes coming from the front or the side of the driver's seat or the front passenger's seat of a vehicle.

2. Description of the Related Art

A conventional vehicular sun visor of this type is configured so that a holder is provided in a sun visor body formed, for example, into a hollow shape, and an insertion-side part on one end side of a shaft bent substantially into an L shape is turnably inserted in the holder and an attachment-side part on the other side of the shaft is attached to the vehicle body side via a bracket, so that the shaft is turnably supported on the bracket, and the sun visor body is turnably supported on the shaft.

In the case where the radiated light such as sunlight and headlamp light of cars in opposite lanes comes from the front of the driver's seat or the front passenger's seat, the sun visor body is turned downward via the shaft so as to face to the driver's seat or the front passenger's seat to shade the radiated light such as sunlight and headlamp light of cars in opposite lanes.

Also, in the case where the radiated light such as sunlight and headlamp light of cars in opposite lanes comes from the side of the driver's seat or the front passenger's seat, the sun visor body is turned downward via the shaft and also turned to the side of vehicle with respect to the bracket, by which the sun visor body is positioned at the vehicle side to shade the radiated light radiated from the side of vehicle (refer to Japanese Unexamined Patent Application Publication No. 9-254649).

For the above-described vehicular sun visor, the range in which light is shaded by the sun visor body is generally fixed. However, in recent years, considering the drive of vehicle for a long period of time from sunrise to sunset, a slide-type sun visor has been known which is configured considering that the radiated light of sunlight coming from the side of vehicle moves in the front and rear direction of vehicle.

Specifically, a slide-type sun visor has been known which is configured so that the sun visor body is slidable with respect to the shaft so that the light shading portion at the side of vehicle can be changed (refer to Japanese Unexamined Patent Application Publication No. 2004-9883).

Figure 10:
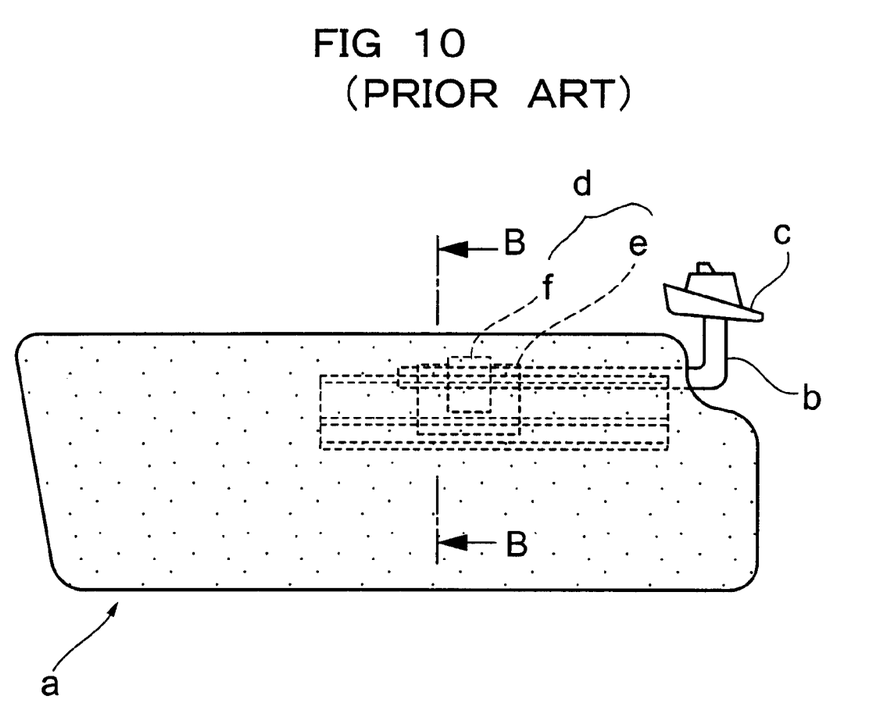
FIG. 10 is a front view of a conventional slide-type sun visor.
Figure 11:
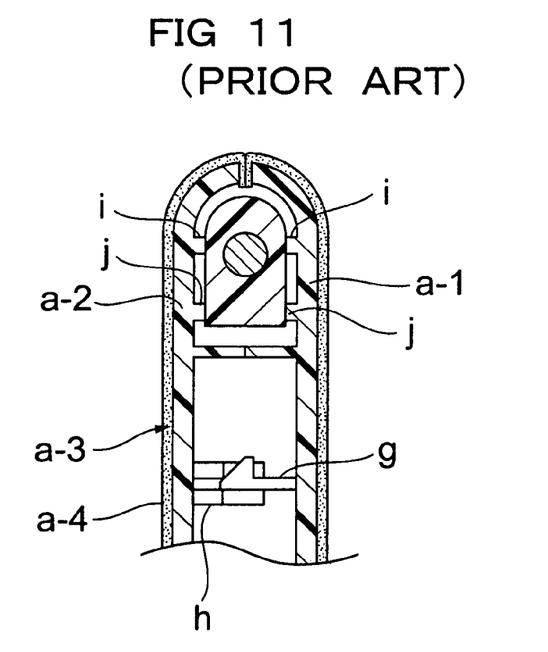
FIG. 11 is a sectional view taken along the line B-B of FIG. 10.

For the slide-type sun visor of this type, as shown in FIG. 10 (a front view of a conventional slide-type sun visor) and FIG. 11 (a sectional view taken along the line B-B of FIG. 10), like the ordinary sun visor in which the light shading range is fixed, a sun visor body a is turnably supported on a shaft b, the shaft b is insertedly supported on a bracket c, and the bracket c is attached to a ceiling part (not show) of a vehicle body panel.

The shaft b is turnably supported on a support assembly d mounted in the sun visor body a. For example, in order to turn the sun visor body a from a state of being stored on the ceiling surface to a service position on the windshield side in front of the driver's seat or the front passenger's seat, the sun visor body a is turned downward around the shaft b.

Also, in order to change the light shading range to the side of vehicle, that is, from the windshield side to the side window side, the sun visor body a is turned around the shaft b and also the shaft b itself is turned around the bracket c, by which the sun visor body a is turned in the right and left direction of vehicle.

Furthermore, the slide-type sun visor shown in FIGS. 10 and 11 has the support assembly d so that the light shading range can be changed freely by sliding the sun visor body a along the axial direction of the shaft b.

That is to say, the support assembly d consists of a support body e formed of a resin molded body and a plate spring f mounted on the support body e. In a shaft hole m in the support body e, the shaft b is inserted, by which the shaft b is turnably supported.

Further, a part of the outer peripheral surface of the shaft b is brought into elastic contact with the plate spring f, by which turning torque at the time when the sun visor body a is turned around the shaft b can be obtained.

More detailedly, the sun visor body a has shell-shaped divided sun visor bodies a-1 and a-2. The divided sun visor bodies a-1 and a-2 are joined to each other in such a manner that the curved outer surface thereof is directed to the outside, by which a hollow resin core material a-3 is formed.

Also, the outer surface of the resin core material a-3 is configured by being covered with a sun visor skin a-4 formed of a woven fabric, nonwoven fabric, synthetic resin sheet, or the like.

The divided sun visor bodies a-1 and a-2 constituting the resin core material a-3 are assembled by engaging a locking claw g provided on one divided sun visor body a-1 with a locking part h provided on the other divided sun visor body a-2.

Also, on the inner surface of each of the divided sun visor bodies a-1 and a-2, guide ribs i and j that contactingly support both side surfaces of the support body e in the support assembly (holder) d are provided. The guide ribs i and j slidably support the support assembly d.

Specifically, the guide ribs i and j are formed at two upper and lower locations of each of the divided sun visor bodies a-1 and a-2 so as to face to each other. The distance between the guide ribs i and the distance between the guide ribs j each are set so as to be smaller than the thickness of the support body e.

By setting the distances in this manner, when the support body e is held by the guide ribs i and j, an elastic contacting force from the guide ribs i and j is applied to the support body e. Therefore, the support assembly (holder) d can be supported surely while it can be slid in the axial direction of the shaft b.

As the recent tendency of vehicle, to enhance the safety and protection of passengers, the vehicle is equipped with various types of airbag systems. Among these airbag systems, a curtain airbag system is sometimes mounted which is disposed along a side roof garnish from a front pillar of vehicle.

On a vehicle equipped with such curtain airbag system, when the sun visor body a shades light on the side window side, a high load is applied to the sun visor body a by the operation of the curtain airbag system.

In the case where a high load is applied to the sun visor body a in this manner, depending on the turning torque generated by the elastic contact with the shaft b due to the plate spring f, the support body e cannot be supported on the shaft b, so that the sun visor body a together with the support body e may come off the shaft b.

In the above situation, there has been known a supporting structure on the shaft that strengthens a force for preventing the support body e from coming off the shaft b (refer to Japanese Unexamined Patent Application Publication No. 2003-312258).

Figure 12:
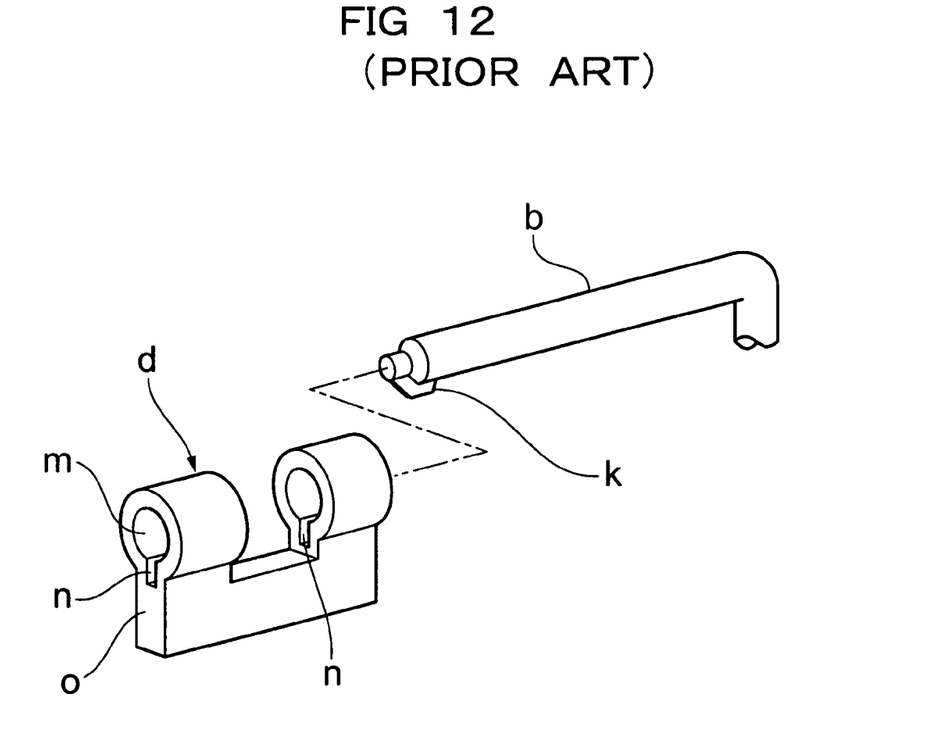
FIG. 12 is an exploded perspective view showing a shaft and a support assembly (holder) of a vehicular sun visor in another conventional example.
Figure 13:
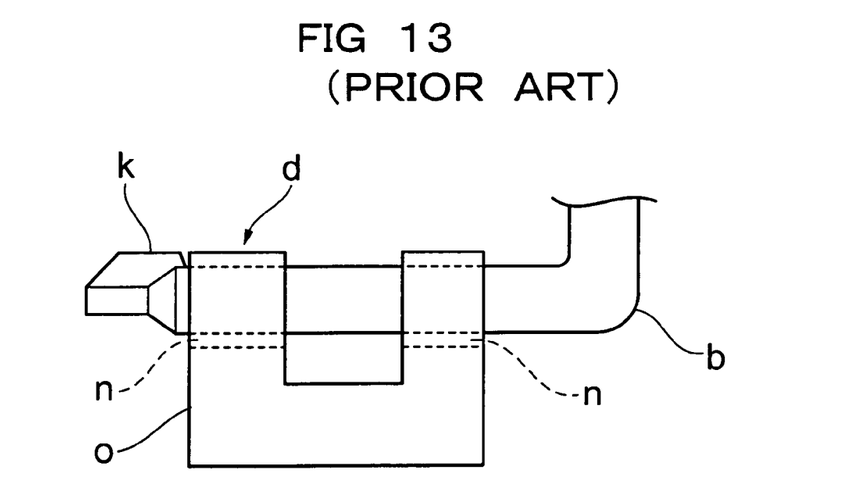
FIG. 13 is a front view showing a state in which a shaft is assembled to a support assembly (holder) in another conventional example.

Such a supporting structure on the shaft is shown in FIG. 12 (an exploded perspective view showing the shaft and the support assembly (holder) of the vehicular sun visor in another conventional example) and FIG. 13 (a front view showing a state in which the shaft is assembled to the support assembly (holder) in another conventional example).

As shown in FIGS. 12 and 13, a coming-off preventing rib k (coming-off preventing contacting piece) having a large rib height is formed in a part of the insertion end part of the shaft b, the insertion end part being inserted in the support body e.

Furthermore, a concave groove n is provided in the inner peripheral surface of the shaft hole m. When the shaft b is inserted into the shaft hole m in the support body e, the coming-off preventing rib k is caused to pass through the concave groove n provided in the inner peripheral surface of the shaft hole m. Further, the sun visor body a is turned around the shaft b, by which the coming-off preventing rib k is engaged with an end face o of the support body e. Thereby, the support body e, and in turn, the sun visor body a can be prevented from coming off the shaft b.

For the conventional vehicular sun visor shown in FIGS. 12 and 13, the coming-off preventing rib k formed in a part of the insertion end part of the shaft b is engaged with the end face o of the support body e, by which the support body e, and in turn, the sun visor body a is prevented from coming off the shaft b. On the other hand, the curtain airbag system is configured so that the curtain airbag is expandingly deployed over a wide range at the side of vehicle from the front pillar to a rear pillar of vehicle, by which not only the driver or the passenger seated on the front side of vehicle but also the passengers seated on the rear seat are restrainedly protected.

Therefore, the curtain airbag system is configured so that the curtain airbag is expandingly deployed by a high expandingly deploying force. Resultantly, such a high expandingly deploying force is applied to the sun visor body a.

Since the coming-off preventing rib k having a large rib height formed in a part of the insertion end part of the shaft b is merely engaged with the end face o of the support body e in a point contact manner or with a small area, a very high concentrated load per unit area is applied.

Therefore, for the conventional vehicular sun visor, although the coming-off preventing rib k has a construction such as to be broken very easily, if being broken off the shaft b, the rib k cannot perform a function of preventing the sun visor body a from coming off.

Accordingly, an object of the present invention is to provide a vehicular sun visor configured so that even if a curtain airbag is expandingly deployed and thereby a high expandingly deploying force is applied to a sun visor body, the sun visor body does not come off a shaft easily because a coming-off preventing piece formed on the shaft is difficult to break.

BRIEF SUMMARY OF THE INVENTION

The present invention provides a vehicular sun visor including a sun visor body formed into a hollow shape; a holder provided in the sun visor body; a shaft bent substantially into an L shape, the insertion-side part on one end side of which is turnably inserted in the holder; and a bracket for attaching an attachment-side part on the other end side of the shaft to the vehicle body side, the sun visor being configured so that the shaft is turnably supported on the bracket, and the sun visor body is turnably supported on the shaft, wherein the sun visor has a coming-off preventing contacting piece formed so as to extendingly project in the radial direction of the shaft throughout the entire periphery of the insertion-side part of the shaft, and a contacted piece formed on the sun visor side so that the coming-off preventing contacting piece contactingly engages with the contacted piece to prevent the sun visor body from coming off the shaft.

The sun visor body is configured so that the outer surface of a resin core material consisting of an injection molded body, a beads expanded body, or the like is covered with a sun visor skin formed of a woven fabric, nonwoven fabric, PVC sheet, or the like.

The configuration may be such that the holder provided in the sun visor body is formed of a synthetic resin molded body such as PP, and is provided with a shaft hole, and by inserting the insertion-side part of the shaft in the shaft hole, the sun visor body is turned around the shaft.

The coming-off preventing contacting piece is formed in the insertion-side part of the shaft so as to be positioned on the outside of the holder.

Also, the separate holder may be provided in the sun visor body. However, the present invention is not limited to this configuration. The holder may be formed integrally with the sun visor body.

The vehicular sun visor in accordance with the present invention not only can be configured so as to be a sun visor of a type such that the holder is mounted in a state in which the holder is nonmovable in the axial direction of the shaft and therefore the sun visor body does not slide with respect to the shaft but also can be configured so as to be a slide-type sun visor in which the sun visor body is configured so as to be movable with respect to the shaft, and the light shading range can be changed by sliding the sun visor body.

By the above-described configuration, in the present invention, the coming-off preventing contacting piece for preventing the sun visor body from coming off the shaft is formed in the insertion-side part of the shaft and is configured so as to contactingly engage with the contacted piece on the sun visor body side, so that the contact area of the coming-off preventing contacting piece with the contacted piece can be kept large.

As the result, even if the sun visor body receives a high expandingly deploying force of a curtain airbag, the reaction force of the coming-off preventing contacting piece received from the contacted piece is distributed to a large area.

Therefore, the concentrated load per unit area can be kept low, so that the coming-off preventing contacting piece can be restrained from being broken, and the sun visor body can surely be prevented from coming off the shaft.

The coming-off preventing contacting piece is preferably formed throughout the entire periphery of the insertion-side part of the shaft. This configuration includes the case where the coming-off preventing contacting piece is formed intermittently throughout the entire periphery of the insertion-side part of the shaft in addition to the case where it is formed continuously throughout the entire periphery of the insertion-side part of the shaft.

In effect, even if the sun visor body is caused to come off the shaft by the expandingly deploying force of the curtain airbag, depending on the vehicle or the vehicle type, the magnitude of the expandingly deploying force differs, and also depending on the rigid structure etc. of the entire of sun visor including the sun visor body and the shaft, the phenomenon of coming-off of the sun visor body from the shaft differs. Therefore, it can be chosen, at the stage of design and development, whether the coming-off preventing contacting piece is formed continuously or intermittently throughout the entire periphery of the insertion-side part of the shaft.

Also, in the present invention, a pair of erected wall parts extending in the lengthwise direction of the sun visor body so as to face to each other are formed on the inner wall of the sun visor body, the holder is disposed between both the erected wall parts so as to be slidable in the axial direction of the shaft, and the sun visor body is supported on the shaft via the holder so as to be slidable with respect to the shaft, by which the light shading range of the sun visor body can be changed.

By the configuration as described above, the vehicular sun visor in accordance with the present invention can be configured as a slide-type vehicular sun visor. In this case, the contacted piece should be formed so as to bridge both of the erected wall parts.

By the configuration as described above, the vehicular sun visor in accordance with the present invention is configured so that the sun visor body is mounted on the shaft so as to be slidable with respect to the shaft, by which the light shading range can be changed.

Moreover, even if the sun visor body receives the high expandingly deploying force of the curtain airbag, the reaction force of the coming-off preventing contacting piece received from the contacted piece formed so as to bridge both of the erected wall parts is distributed to the entire of the coming-off preventing contacting piece that is in contact with the contracted piece with a large area because the coming-off preventing contacting piece is formed so as to extendingly project in the radial direction of the shaft throughout the entire periphery of the insertion-side part of the shaft.

In addition, since the contacted piece is formed so as to bridge both of the erected wall parts, the rigidity of the contacted piece can be enhanced, so that the concentrated load per unit area applied to the coming-off preventing contacting piece can be kept low.

Therefore, the coming-off preventing contacting piece can be restrained from being broken, and the sun visor body can surely be prevented from coming off the shaft.

The contacted piece formed so as to bridge the paired erected wall parts may be formed in an intermediate portion of the erected wall parts. However, by forming the contacted piece 7 on the end part side of the erected wall parts, the slide amount of the sun visor body with respect to the shaft may be set in a wide range.

Further, in the present invention, the sun visor body can be formed by joining a pair of divided sun visor bodies, each of which is formed into a shell shape, in a hollow shape.

In this case, the paired erected wall parts are formed on the inner wall of one divided sun visor body of the paired divided sun visor bodies.

By the configuration described above, the manpower for product assembly of the vehicular sun visor in accordance with the present invention is reduced because the vehicular sun visor is formed by joining the paired divided sun visor bodies, and also the light shading range can be changed because the sun visor body is mounted on the shaft so as to be slidable with respect to the shaft and the sun visor body slides.

Moreover, even if the sun visor body receives the high expandingly deploying force of the curtain airbag, the reaction force of the coming-off preventing contacting piece received from the contacted piece formed so as to bridge both of the erected wall parts is distributed to the entire of the coming-off preventing contacting piece that is in contact with the contracted piece with a large area because the coming-off preventing contacting piece is formed so as to extendingly project in the radial direction of the shaft from the insertion-side part of the shaft.

In addition, since the contacted piece is formed so as to bridge both of the erected wall parts, the rigidity of the contacted piece can be enhanced. Therefore, the coming-off preventing contacting piece can be restrained from being broken, and the sun visor body can surely be prevented from coming off the shaft.

Further, in the present invention, the sun visor body is formed by joining the paired divided sun visor bodies, and the contacted piece is formed so as to bridge the paired erected wall parts formed on the inner wall of one divided sun visor body, and in addition, an auxiliary contacted piece facing to the outside of the contacted piece formed so as to bridge both of the erected wall parts is formed on the inner wall of the other divided sun visor body.

Generally, in the case where the sun visor body is formed by joining the paired divided sun visor bodies, if the expandingly deploying load is applied to the sun visor body, the joint part of the assembled divided sun visor bodies may open. In this case, if only the contacted piece 7 formed on one divided sun visor body side is provided, the contacted piece and the coming-off preventing contacting piece on the shaft side do not face to each other, so that the sun visor body may come off the shaft.

However, if the auxiliary contacted piece is formed on the other divided sun visor body side as described above, even when both of the divided sun visor bodies are open, at least either one of the contacted piece and the auxiliary contacted piece faces to the coming-off preventing contacting piece, so that the sun visor body can be prevented from coming off the shaft.

Moreover, since the contacted piece and the auxiliary contacted piece have a double construction facing to each other, the coming-off preventing contacting piece is also supported indirectly by the auxiliary contacted piece together with the contacted piece, so that the sun visor body can further surely be prevented from coming off the shaft.

DETAILED DESCRIPTION OF THE INVENTION

One example of a vehicular sun visor in accordance with the present invention will now be described with reference to FIG. 1.

Figure 1:
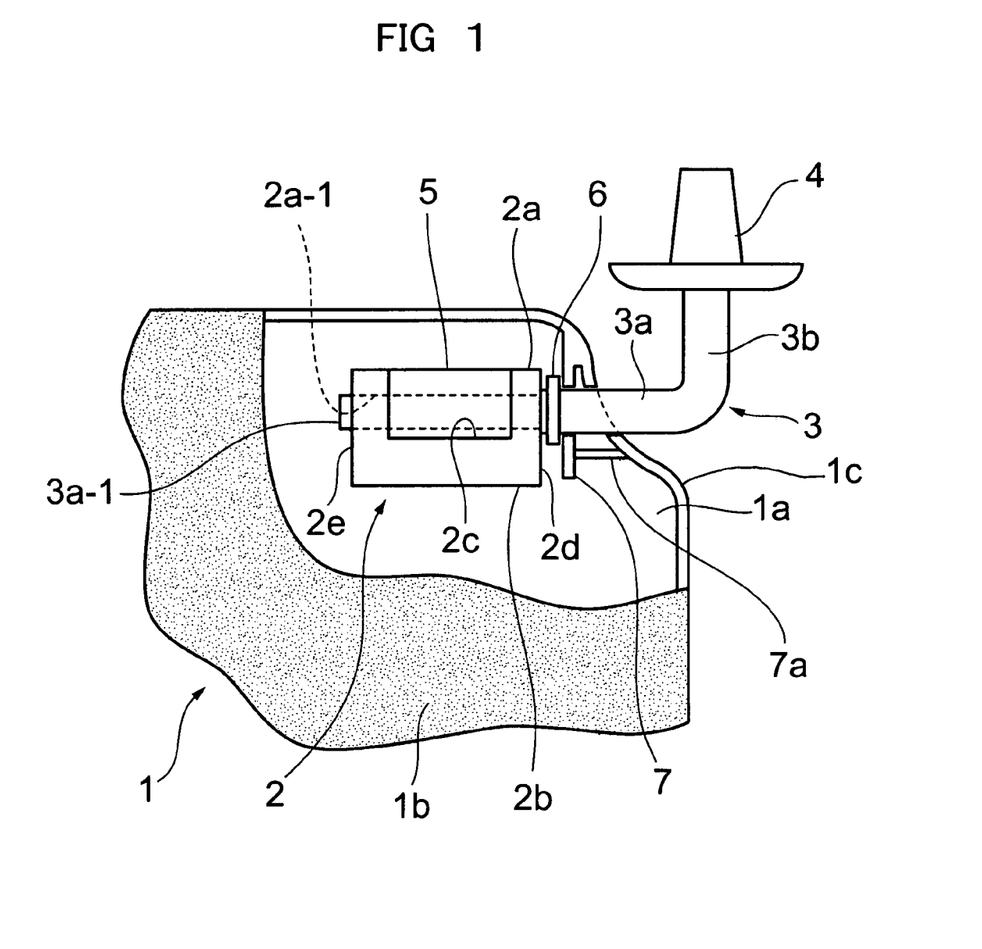
FIG. 1 is a front view of an essential portion of a vehicular sun visor employing one example in accordance with the present invention, showing by cutting a part of a sun visor body.

FIG. 1 is a front view of an essential portion of a vehicular sun visor employing a first example in accordance with the present invention, showing by cutting a part of a sun visor body.

The vehicular sun visor shown in FIG. 1 is configured so as to have a rectangular sun visor body 1 formed into a plate shape and a hollow shape, which shades radiated light coming to the front or the side of the driver's seat or the front passenger's seat of a vehicle, a holder 2 provided in the sun visor body 1, a shaft 3 formed by being bent substantially into an L shape, the insertion-side part 3a one end side of which is turnably inserted in the holder 2, and a bracket 4 for attaching an attachment-side part 3b on the other end side of the shaft 3 to the vehicle body (not shown) side.

The bracket 4 turnably supports the shaft 3, and the shaft 3 turnably supports the sun visor body 1.

The sun visor body 1 is configured so that the outer surface of a resin core material 1a consisting of an injection molded body, a beads expanded body, or the like is covered with a sun visor skin 1b formed of a woven fabric, nonwoven fabric, PVC sheet, or the like.

As explained in detail later, the resin core material 1a is configured by joining a pair of divided sun visor bodies 1a-1 and 1a-2.

The holder 2 provided in the sun visor body 1 is formed of a resin molded body molded by the injection molding of a synthetic resin such as PP, and consists of a cylindrical shaft receiving part 2a and a plate-shaped attachment part 2b. The shaft receiving part 2a is provided with a shaft hole 2a-1 through which the insertion-side part 3a of the shaft 3 is turnably inserted, and is divided into two rows in the front and rear direction with an opening 2c for inserting a plate spring 5 being a boundary.

The plate spring 5 is brought into elastic contact with a part of the outer peripheral surface of the insertion-side part 3a of the shaft 3 received by the shaft hole 2a-1, by which turning torque at the time when the sun visor body 1 is turned around the shaft 3 can be obtained.

The insertion-side part 3a of the shaft 3 is continuous with the attachment-side part 3b in such a manner that the attachment-side part 3b side projects from one-side end face 2d and further projects from a side wall part 1c of the sun visor body 1.

Also, in the insertion-side part 3a of the shaft 3, a coming-off preventing contacting piece 6 is formed so as to extendingly project in the radial direction of the shaft 3 continuously throughout the entire periphery.

The coming-off preventing contacting piece 6 is formed in an approximately middle portion of the insertion-side part 3a of the shaft 3 so as to be positioned on the outside (the attachment-side part 3b side) of the holder 2 in the insertion-side part 3a of the shaft 3.

In the side wall part 1c of the sun visor body 1, a contacted piece 7 is formed so as to contactingly engage with the coming-off preventing contacting piece 6 so as to face thereto in the sun visor body 1.

The contacted piece 7 has a rib shape. One end side of the contacted piece 7 is plantingly provided in the side wall part 1c of the sun visor body 1, and the other end side thereof is connectingly provided in the side wall part 1c of the sun visor body 1 via a reinforcing rib 7a.

In one example in accordance with the present invention, which is configured as described above, the sun visor body 1 is provided at a position facing to the driver's seat or the front passenger's seat of vehicle by attaching the attachment-side part 3b of the shaft 3 to the ceiling part (not shown) side of a vehicle body via the bracket 4.

As the result, in the case where radiated light such as sunlight and headlamp light of cars in opposite lanes comes from the front of the driver's seat or the front passenger's seat of the vehicle through the windshield, the sun visor body 1 is turned downward so as to face to the driver's seat or the front passenger's seat via the shaft 3, by which the radiated light can be shaded.

Also, in the case where the radiated light such as sunlight and headlamp light of cars in opposite lanes comes from the side of the driver's seat or the front passenger's seat of the vehicle through the side window, the sun visor body 1 is turned downward via the shaft 3 and also turned to the side of vehicle with respect to the bracket 4 to be positioned at the side of vehicle, by which the radiated light radiated through the side window at the side of vehicle can be shaded.

In the case where the vehicle encounters, for example, a side collision accident and a curtain airbag system (not shown) disposed along a side rail garnish from the front pillar of vehicle operates when the sun visor body 1 is positioned at the side of vehicle to shade the radiated light radiated through the side window, and the sun visor body 1 receives the expandingly deploying force of the curtain airbag, a force such as to cause the sun visor body 1 to come off the shaft 3 acts on the sun visor body 1.

In the case where the impact force such as to cause the sun visor body 1 to come off the shaft 3 is applied to the sun visor body 1 in this manner, the coming-off preventing contacting piece 6 formed in the insertion-side part 3a of the shaft 3 contactingly engages with the contacted piece 7 formed in side wall part 1c of the sun visor body 1, by which the sun visor body 1 is prevented from coming off the shaft 3.

The coming-off preventing contacting piece 6 is formed continuously throughout the entire periphery of the insertion-side part 3a of the shaft 3 and engages contactingly with the contacted piece 7 on the sun visor body side with a surface contact, so that the contact area of the coming-off preventing contacting piece 6 with respect to the contacted piece 7 can be kept large.

As the result, even if the sun visor body 1 receives a high expandingly deploying force of the curtain airbag, the reaction force of the coming-off preventing contacting piece 6 received from the contacted piece 7 is distributed to a large area, so that the concentrated load per unit area can be kept low. Therefore, the coming-off preventing contacting piece 6 can be restrained from being broken, and the sun visor body 1 can surely be prevented from coming off the shaft 3.

In the above-described example, the coming-off preventing contacting piece 6 is formed throughout the entire periphery of the insertion-side part 3a of the shaft 3. This configuration includes the case where the coming-off preventing contacting piece 6 is formed intermittently throughout the entire periphery of the insertion-side part 3a of the shaft 3 in addition to the case where it is formed continuously throughout the entire periphery of the insertion-side part 3a of the shaft 3.

In effect, even if the sun visor body 1 is caused to come off the shaft 3 by the expandingly deploying force of the curtain airbag, depending on the vehicle or the vehicle type, the magnitude of the expandingly deploying force differs, and also depending on the rigid structure etc. of the entire of sun visor including the sun visor body 1 and the shaft 3, the phenomenon of coming-off of the sun visor body 1 from the shaft 3 differs.

Therefore, it can be chosen whether the coming-off preventing contacting piece 6 is formed continuously or intermittently throughout the entire periphery of the insertion-side part 3*a* of the shaft 3.

Also, in the above-described example, the contacted piece 7 is formed so as to be connectingly provided in the side wall part 1*c* of the sun visor body 1. However, the coming-off preventing contacting piece 6 may be brought into contact with the side wall part 1*c* of the sun visor body 1 serving as the contacted piece 7.

Also, in the above-described example, the holder 2 is mounted in a state of being nonmovable in the axial direction of the shaft 3 and is suitable for the case where a sun visor of a type such that the sun visor body 1 does not slide with respect to the shaft 3 is configured. However, the present invention is not limited to this configuration. The configuration may be such that the holder 2 is configured so as to be movable in the axial direction of the shaft 3, and the sun visor body 1 is allowed to slide with respect to the shaft 3, by which a slide-type sun visor capable of changing the light shading range can be formed.

Next, another example in which the present invention is applied to a slide-type vehicular sun visor is explained with reference to FIGS. 2 to 8.

Figure 2:
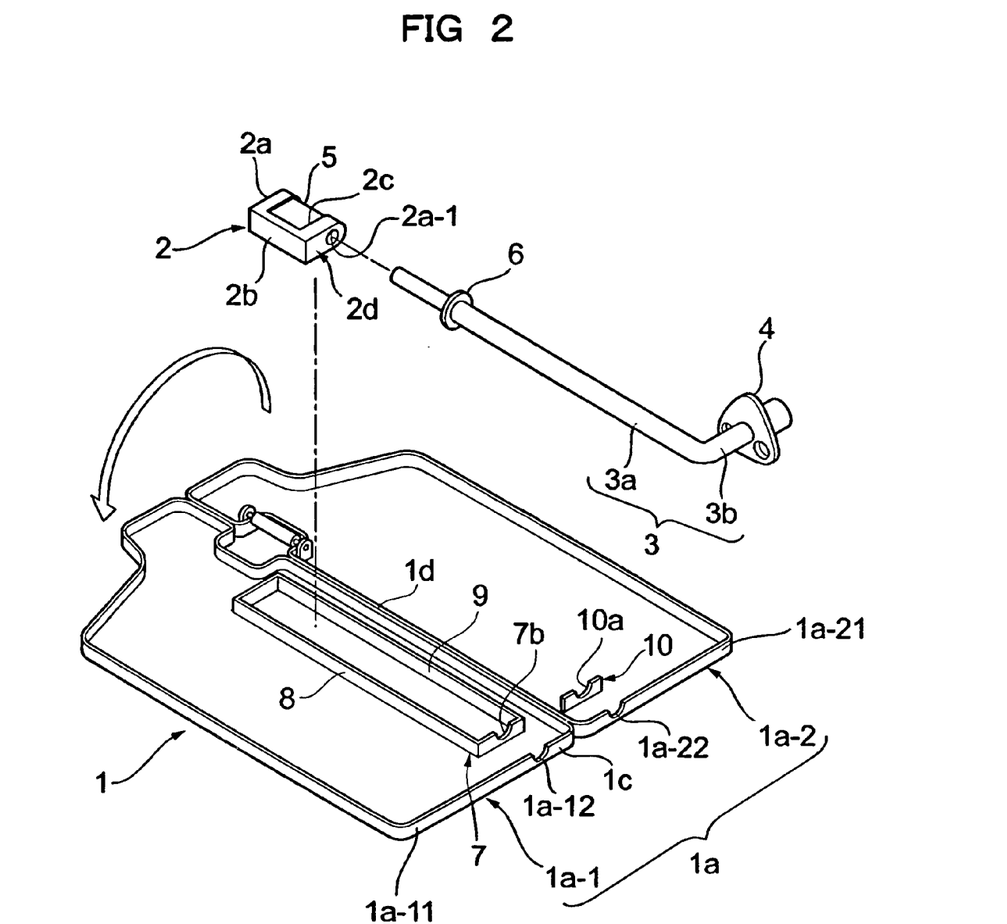
FIG. 2 is an exploded perspective view of a vehicular sun visor employing another example in accordance with the present invention.
Figure 3:
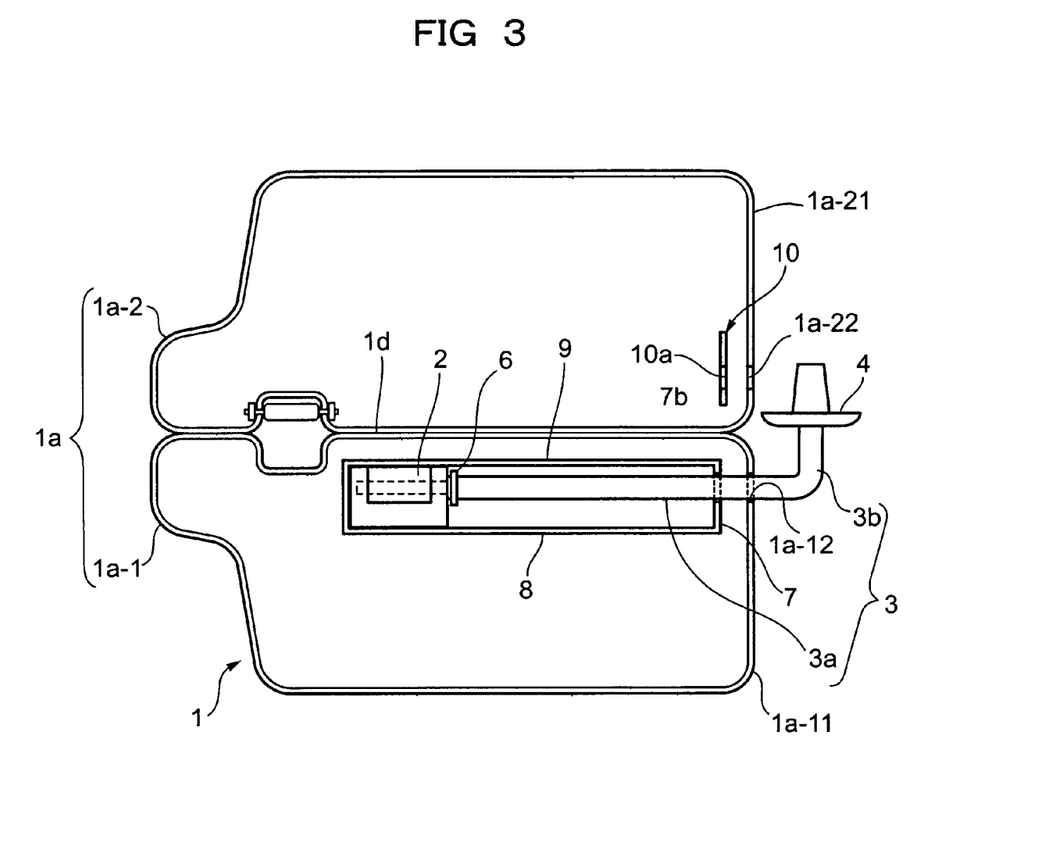
FIG. 3 is a front view of a pair of divided sun visor bodies constituting a sun visor body, showing a state in which the divided sun visor bodies are spreadingly opened.
Figure 4:
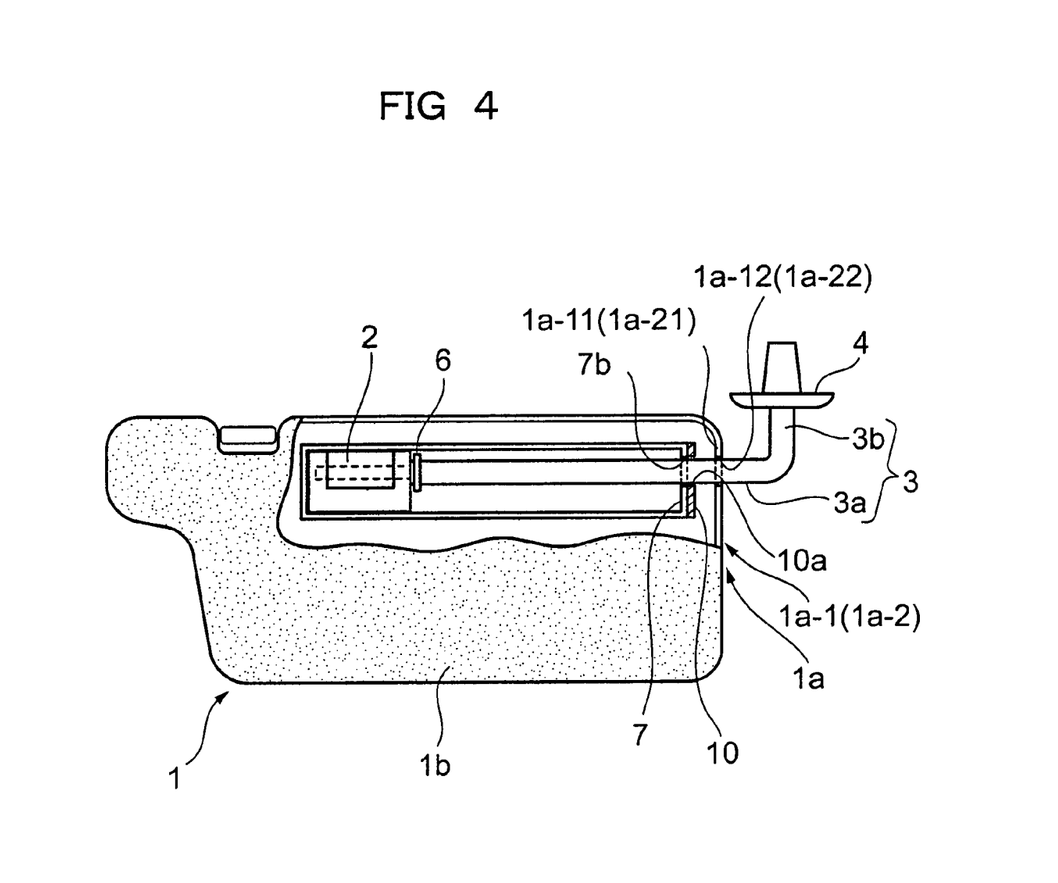
FIG. 4 is a partially broken front view showing a state in which a pair of divided sun visor bodies constituting a sun visor body are joined and assembled.
Figure 5:
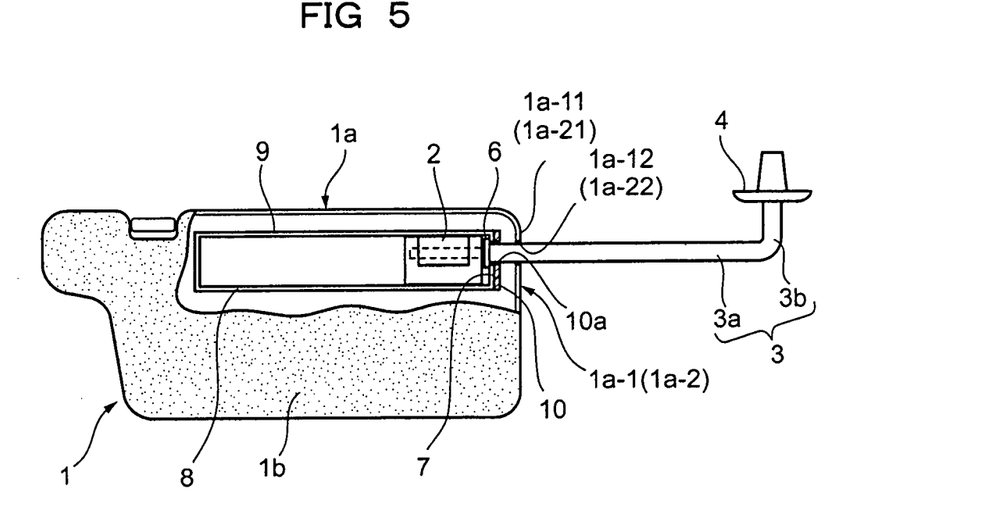
FIG. 5 is a partially broken front view showing a state in which a sun visor body is slid with respect to a shaft to change a light shading portion.
Figure 6:
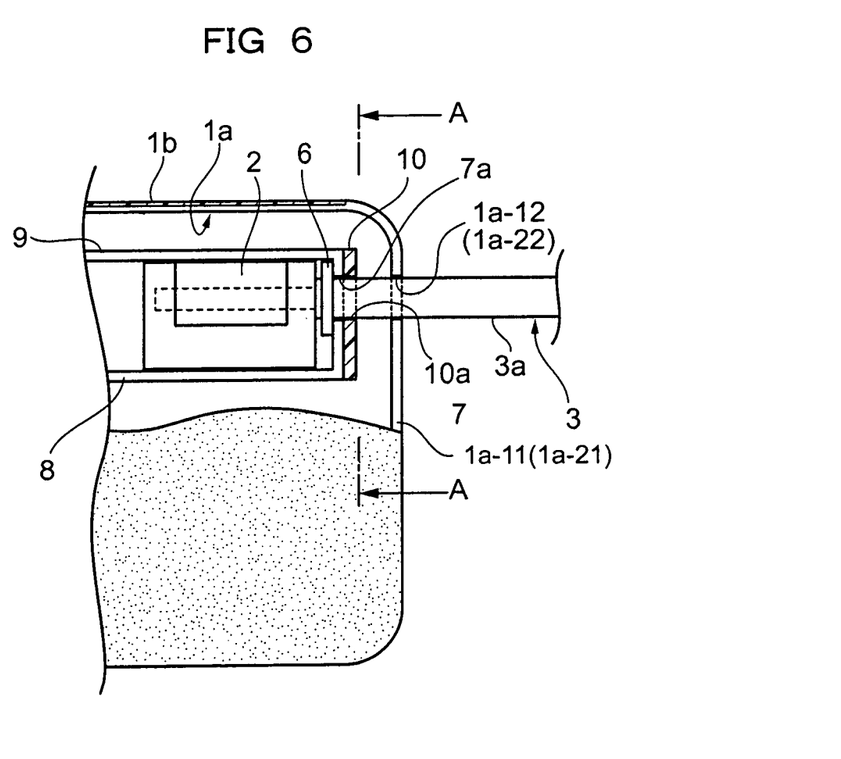
FIG. 6 is an enlarged view of an essential portion of FIG. 5.
Figure 7:
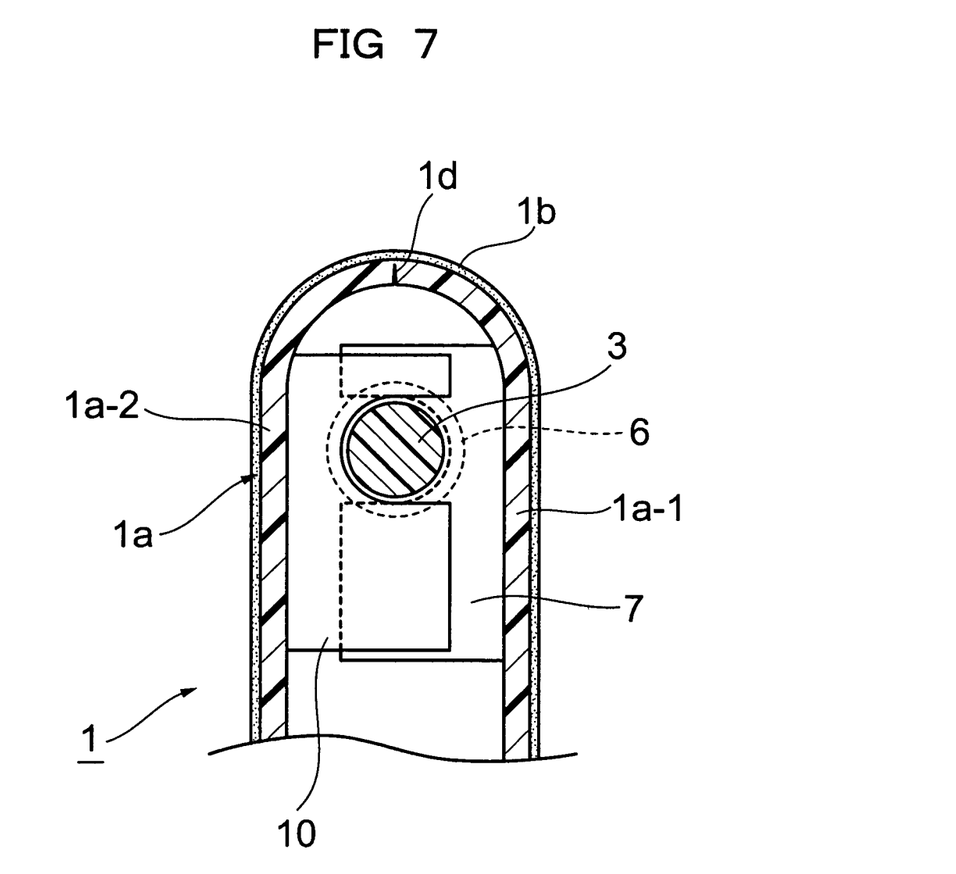
FIG. 7 is a sectional view taken along the line A-A of FIG. 6.
Figure 8:
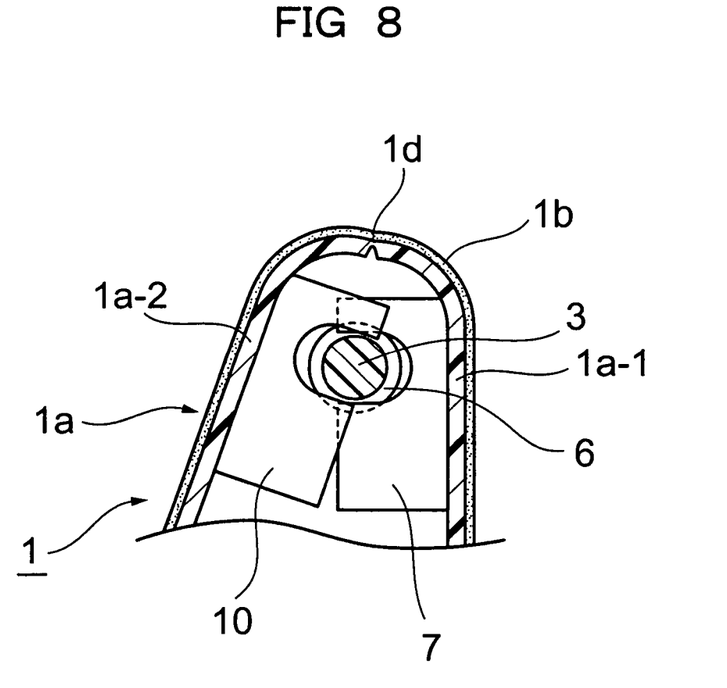
FIG. 8 is an explanatory view of operation in the case where an auxiliary contacted part is provided.

FIG. 2 is an exploded perspective view of a vehicular sun visor employing another example in accordance with the present invention, FIG. 3 is a front view of a pair of divided sun visor bodies constituting a sun visor body, showing a state in which the divided sun visor bodies are spreadingly opened, FIG. 4 is a partially broken front view showing a state in which the paired divided sun visor bodies constituting the sun visor body are joined and assembled, FIG. 5 is a partially broken front view showing a state in which the sun visor body is slid with respect to a shaft to change a light shading portion, FIG. 6 is an enlarged view of an essential portion of FIG. 5, FIG. 7 is a sectional view taken along the line A-A of FIG. 6, and FIG. 8 is an explanatory view of operation in the case where an auxiliary contacted part is provided.

First, in FIGS. 2 and 3, the vehicular sun visor in this example has, as in the above-described example, a rectangular sun visor body 1 formed into a plate shape and a hollow shape, which shades the radiated light coming to the front or the side of the driver's seat or the front passenger's seat of the vehicle, a holder 2 provided in the sun visor body 1, a shaft 3 formed by being bent substantially into an L shape, the insertion-side part 3*a* on one end side of which is turnably inserted in the holder 2, and a bracket 4 for attaching an attachment-side part 3*b* on the other end side of the shaft 3 to the vehicle body (not shown) side.

The bracket 4 turnably supports the shaft 3, and the shaft 3 turnably supports the sun visor body 1.

The sun visor body 1 is configured so that the outer surface of a resin core material 1*a* consisting of an injection molded body, a beads expanded body, or the like is covered with a sun visor skin 1*b* formed of a woven fabric, nonwoven fabric, PVC sheet, or the like as clearly shown in FIG. 4. As explained in detail later, the resin core material 1*a* is configured by joining a pair of divided sun visor bodies 1*a*-1 and 1*a*-2 in a hollow shape.

The holder 2 provided in the sun visor body 1 is formed of a resin molded body molded by the injection molding of a synthetic resin such as PP, and consists of a cylindrical shaft receiving part 2*a* and a plate-shaped attachment part 2*b*.

The shaft receiving part 2*a* is provided with a shaft hole 2*a*-1 through which the insertion-side part 3*a* of the shaft 3 is turnably inserted, and is divided into two rows in the front and rear direction with an opening 2*c* for inserting a plate spring 5 being a boundary.

The plate spring 5 is brought into elastic contact with a part of the outer peripheral surface of the insertion-side part 3*a* of the shaft 3 received by the shaft hole 2*a*-1, by which turning torque at the time when the sun visor body 1 is turned around the shaft 3 can be obtained.

The insertion-side part 3*a* of the shaft 3 is continuous with the attachment-side part 3*b* in such a manner that the attachment-side part 3*b* side projects from one-side end face 2*d* and further projects from a side wall part 1*c* of the sun visor body 1.

Further, in the insertion-side part 3*a* of the shaft 3, a coming-off preventing contacting piece 6 is formed so as to extendingly project in the radial direction of the shaft 3 continuously throughout the entire periphery.

The coming-off preventing contacting piece 6 is formed close to the holder 2 in the insertion-side part 3*a* of the shaft 3 so as to be positioned on the outside (the attachment-side part 3*b* side) of the holder 2 in the insertion-side part 3*a* of the shaft 3.

The resin core material 1*a* of the sun visor body 1 is formed into a hollow shape by joining the shell-shaped divided sun visor bodies 1*a*-1 and 1*a*-2 to each other in such a manner that the curved outer surface thereof is directed to the outside.

The divided sun visor bodies 1*a*-1 and 1*a*-2 are molded so as to be connected to each other via an integrally molded hinge part 1*d*, and, as in the conventional example, are assembled by engaging a locking claw (not shown) provided on one divided sun visor body 1*a*-1 with a locking part (not shown) provided on the other divided sun visor body 1*a*-2.

On the inner wall of one divided sun visor body 1*a*-1, a pair of erected wall parts 8 and 9 spacedly facing to each other are formed integrally when the sun visor body 1 is molded. Between the erected wall parts 8 and 9, the holder 2 is accommodated so as to be slidable in the lengthwise direction of the sun visor body 1.

When the divided sun visor bodies 1*a*-1 and 1*a*-2 are joined to each other, the holder 2 is held between the divided sun visor bodies 1*a*-1 and 1*a*-2, so that the holder 2 does not come off the sun visor body 1.

Further, both the end parts of the erected wall parts 8 and 9 are closed by side walls. Of both the side walls, the side wall that is present on the attachment-side part 3*b* side of the shaft 3 forms a contacted piece 7 that contactingly engages with the coming-off preventing contacting piece 6 so as to face thereto in the sun visor body 1.

The contacted piece 7 is formed with a semicircularly notched shaft receiving part 7*b* to receive the insertion-side part 3*a* of the shaft 3.

Also, on the inner wall of the other divided sun visor body 1*a*-2, an auxiliary contacted piece 10 is erectedly formed so as to be present between a side wall part 1*a*-21 of the other divided sun visor body 1*a*-2 and the contacted piece 7 in the state in which the divided sun visor bodies 1*a*-1 and 1*a*-2 are joined to each other as shown in FIG. 6.

As shown in detail in FIG. 6, the auxiliary contacted piece 10 is formed so as to be close to or in contact with the contacted piece 7 when the divided sun visor bodies 1*a*-1 and 1*a*-2 are joined to each other.

The auxiliary contacted piece 10 is also formed with a semicircularly notched shaft receiving part 10*a* to receive the insertion-side part 3*a* of the shaft 3. The notched shaft receiving part 7b and the notched shaft receiving part 10a are configured so as to form a substantially circular hole in side view.

Further, in the side wall parts 1a-11 and 1a-21 of the divided sun visor bodies 1a-1 and 1a-2, notched shaft receiving parts 1a-12 and 1a-22 which also form a circular hole in side view when the divided sun visor bodies 1a-1 and 1a-2 are joined to each other are provided, respectively.

The notched shaft receiving parts 1a-12 and 1a-22 are also formed so as to receive the insertion-side part 3a of the shaft 3.

By the above-described configuration, in this example, the sun visor body 1 is mounted on the shaft 3 so as to be slidable with respect to the shaft 3, and the light shading range of the sun visor body 1 can be changed by sliding the sun visor body 1 in the axial direction of the shaft 3. At the slide position, the sun visor body 1 is held on the shaft 3 by the turning torque of the plate spring 5.

Moreover, even if the sun visor body 1 receives the high expandingly deploying force of the curtain airbag, as shown in FIGS. 5 and 6, the coming-off preventing contacting piece 6 on the shaft 3 side contactingly engages with the contacted piece 7 formed so as to bridge both the erected wall parts 8 and 9 on the sun visor body 1 side, by which the sun visor body 1 can be prevented from coming off the shaft 3.

Since the coming-off preventing contacting piece 6 extendingly projects in the radial direction of the shaft 3 throughout the entire periphery of the insertion-side part 3a of the shaft 3, the reaction force of the coming-off preventing contacting piece 6 received from the contacted piece 7 is distributed to the whole of the coming-off preventing contacting piece 6 with a large area, so that the concentrated load per unit area applied to the coming-off preventing contacting piece 6 can be kept low.

Therefore, the coming-off preventing contacting piece 6 can be restrained from being broken, and the sun visor body 1 can surely be prevented from coming off the shaft 3.

The contacted piece 7 formed so as to bridge the paired erected wall parts 8 and 9 may be formed in an intermediate portion of the erected wall parts 8 and 9. However, by forming the contacted piece 7 on the end part side of the erected wall parts 8 and 9, the slide amount of the sun visor body 1 with respect to the shaft 3 may be set in a wide range.

Further, on the inner wall of the other divided sun visor body 1a-2, the auxiliary contacted piece 10 is erectedly formed so as to be present between the side wall part 1a-21 of the other divided sun visor body 1a-2 and the contacted piece 7.

Figure 9:
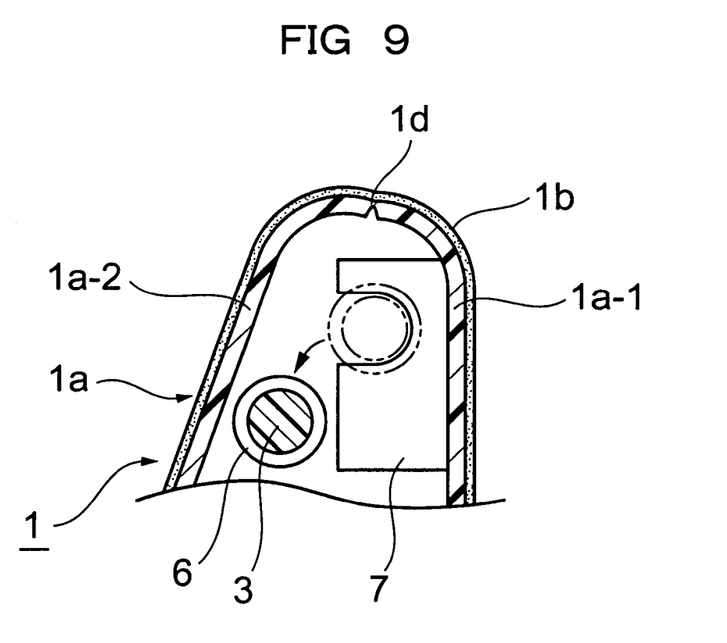
FIG. 9 is an explanatory view of operation in the case where an auxiliary contacted part is not provided.

In the case where the auxiliary contacted piece 10 is not provided, if the divided sun visor bodies 1a-1 and 1a-2 joined to each other are opened, for example, by the application of the expandingly deploying load of curtain airbag, if only the contacted piece 7 formed on one divided sun visor body side is provided, the coming-off preventing contacting piece 6 cannot be contactingly engaged with the contacted piece 7 (refer to FIG. 9), so that the sun visor body 1 may come off the shaft 3. However, by providing the auxiliary contacted piece 10 as described above, the sun visor body 1 can be prevented from coming off the shaft 3 due to the opening of the joint portion of the assembled divided sun visor bodies 1a-1 and 1a-2 even in the case where the expandingly deploying load of curtain airbag is applied to the sun visor body 1 because the auxiliary contacted piece 10 is formed so as to close to or in contact with, as shown in the figure, the contacted piece 7 when the divided sun visor bodies 1a-1 and 1a-2 are joined to each other.

That is to say, as shown in FIG. 8, at least either one of the contacted piece 7 and the auxiliary contacted piece 10 can engage with the coming-off preventing contacting piece 6, so that the sun visor body 1 can always be prevented from coming off the shaft 3.

Moreover, since the contacted piece 7 and the auxiliary contacted piece 10 have a double construction facing to each other, the coming-off preventing contacting piece 6 is also supported indirectly by the auxiliary contacted piece 10 together with the contacted piece 7, so that the sun visor body 1 can further surely be prevented from coming off the shaft 3.

In the above-described example, the separate holder 2 is provided in the sun visor body 1. However, the present invention is not limited to this configuration. The holder 2 may be formed integrally with the sun visor body 1.

According to the present invention configured as described above, the coming-off preventing contacting piece for preventing the sun visor body 1 from coming off the shaft 3 is formed so as to extendingly project in the radial direction of the shaft throughout the entire periphery of the insertion-side part of the shaft 3, and is configured so as to come into contact with the contacted piece on the sun visor body side. Therefore, the contact area of the coming-off preventing contacting piece with the contacted piece can be kept large.

As the result, even if the sun visor body receives the high expandingly deploying force of the curtain bag, the reaction force of the coming-off preventing contacting piece received from the contacted piece is distributed to a large area, so that the concentrated load per unit area can be kept low. Therefore, the coming-off preventing contacting piece can be restrained from being broken, and the sun visor body can surely be prevented from coming off the shaft.

Thereupon, the present invention is suitable for the vehicular sun visor etc. for shading the radiated light such as sunlight and headlamp light of cars in opposite lanes coming from the front or the side of the driver's seat or the front passenger's seat of vehicle.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A vehicular sun visor comprising:
   a sun visor body including a pair of divided sun visor bodies, each of which is formed into a shell shape, the sun visor body formed into a hollow shape by joining the pair of divided sun visor bodies;
   a holder provided in the sun visor body;
   a shaft bent substantially into an L shape, an insertion-side part on one end side of which is turnably inserted in the holder;
   a bracket for attaching an attachment-side part on the other end side of the shaft to the vehicle body side, the sun visor being configured so that the shaft is turnably supported on the bracket and the sun visor body is turnably supported on the shaft;
   a coming-off preventing contacting piece formed near the holder in the insertion-side part of the shaft, so as to extendingly project in the radial direction of the shaft throughout the entire periphery of the insertion-side part of the shaft;
   a contacted piece, formed on an inner wall of one divided sun visor body of the pair of divided sun visor bodies, including a first shaft receiving part for receiving the insertion-side part of the shaft;

an auxiliary contacted piece, formed on an inner wall of the other divided sun visor body, including a second shaft receiving part for receiving the insertion-side part of the shaft; and a pair of erected wall parts extending in the lengthwise direction of the sun visor body so as to face each other and formed on the inner wall of the one divided sun visor body, wherein the contacted piece and the auxiliary contacted piece are formed such that a portion of the first receiving part faces a portion of the second receiving part in an axial direction of the insertion-side part of the shaft so as to overlap and contact the portion of the second receiving part in a plane perpendicular to the axial direction when the pair of divided sun visor bodies are joined to each other and the first and second shaft receiving parts receive the insertion-side part of the shaft, wherein the contacted piece is formed so as to bridge both of the erected wall parts, wherein both end parts of the erected wall parts are closed by a first side wall and a second side wall that forms the contacted piece, wherein the holder is disposed in an area that is closed by the erected wall parts, the first side wall, and the second side wall, so as to be slidable in the axial direction of the insertion-side part of the shaft, and wherein the sun visor body is supported on the shaft via the holder so as to be slidable with respect to the shaft, by which the light shading range of the sun visor body is changeable.

2. The vehicular sun visor according to claim 1, wherein the auxiliary contacted piece is formed on the inner wall of the other divided sun visor body so as to face the outside side of the contacted piece formed so as to bridge both of the erected wall parts.

3. The vehicular sun visor according to claim 1, wherein the holder is supported by both the erected wall parts.

* * * * *